United States Patent
Srour

(10) Patent No.: US 10,774,871 B1
(45) Date of Patent: Sep. 15, 2020

(54) SLIDING HINGE COLLAPSIBLE DISCS

(71) Applicant: Ikey Srour, Brooklyn, NY (US)

(72) Inventor: Ikey Srour, Brooklyn, NY (US)

(73) Assignee: QUEST USA CORP., Brooklyn, NY (US)

( * ) Notice: Subject to any disclaimer, the term of this patent is extended or adjusted under 35 U.S.C. 154(b) by 18 days.

(21) Appl. No.: 16/354,475

(22) Filed: Mar. 15, 2019

(51) Int. Cl.
 A44B 5/00 (2006.01)
 F16C 11/04 (2006.01)
 F16C 11/12 (2006.01)
 H04R 1/10 (2006.01)

(52) U.S. Cl.
 CPC ............ F16C 11/045 (2013.01); F16C 11/12 (2013.01); H04R 1/1033 (2013.01)

(58) Field of Classification Search
 CPC ....... F16C 11/045; F16C 11/12; G08B 25/016
 See application file for complete search history.

(56) References Cited

U.S. PATENT DOCUMENTS

| | | | | |
|---|---|---|---|---|
| 1,483,363 A * | 2/1924 | Mann | ....................... | A44B 3/02 24/102 P |
| 1,573,477 A * | 2/1926 | Byron | ....................... | A44B 5/00 24/102 P |
| 1,942,744 A * | 1/1934 | Garfield | .................... | A44B 3/02 24/114.11 |
| 2,145,211 A * | 1/1939 | Dixon | .................... | A44B 5/002 24/102 PL |
| 2,461,845 A * | 2/1949 | Osterberg | .............. | A44B 5/002 24/100 |
| 2,519,821 A * | 8/1950 | Burr, Jr. | .................. | A44B 5/002 24/97 |
| 2,825,378 A | 3/1958 | Vaca | | |
| 2,859,501 A * | 11/1958 | Pero | ......................... | A44B 1/18 24/97 |
| 3,149,385 A * | 9/1964 | Beekenkamp | ........... | A44B 5/00 24/101 R |
| 3,418,699 A * | 12/1968 | Feldman | ................ | A44B 5/002 24/90.5 |
| 3,773,203 A | 11/1973 | Grimaldi et al. | | |
| 4,507,344 A * | 3/1985 | Baughman | ............. | A44C 3/001 24/103 |
| 4,760,866 A | 8/1988 | Adler | | |
| D314,865 S | 2/1991 | Tuisku | | |
| D327,808 S | 7/1992 | Kline | | |

(Continued)

OTHER PUBLICATIONS

Fasttech.com. RFID Blocking Credit Card Holder Wallet Money Clip Case. Date listed Oct. 2017 [date retrieved Mar. 6, 2018]: https://www.fasttech.com/products/9343200.

*Primary Examiner* — Jason W San

(74) *Attorney, Agent, or Firm* — Michael J. Feigin, Esq.; Feigin and Fridman, LLC

(57) ABSTRACT

Collapsible discs move towards or away from each other in embodiments of the disclosed technology by changing the angle of flanges which connect the two discs together. The flanges connect to each respective disc by way of one of a living hinge and/or a slidable hinge where a slidable hinge is one which includes a crossbeam wider than a body of the flange which slides within a cavity of one of the discs. This can be accomplished with two flanges which move in opposite directions, or two sets of two flanges, each set offset 90 degrees from one another. The two flanges can also be arranged such that one passes through a portal in the other or arranged side by side.

16 Claims, 8 Drawing Sheets

(56) References Cited

U.S. PATENT DOCUMENTS

| | | |
|---|---|---|
| D330,632 S | 11/1992 | Hensley |
| D332,347 S | 1/1993 | Raadt et al. |
| D352,896 S | 11/1994 | Jones |
| D404,762 S | 1/1999 | Vogel |
| 5,944,080 A | 8/1999 | Podwika |
| D446,647 S | 8/2001 | Protheroe |
| D446,648 S | 8/2001 | Protheroe |
| D447,868 S | 9/2001 | Protheroe |
| D470,657 S | 2/2003 | Kawamura |
| D471,008 S | 3/2003 | Dubone |
| D475,696 S | 6/2003 | Hussaini et al. |
| D481,537 S | 11/2003 | Vaughn |
| D489,051 S | 4/2004 | Shiraki et al. |
| 6,736,285 B2 | 5/2004 | Steward-Stand |
| D492,944 S | 7/2004 | Drakoulis et al. |
| D509,955 S | 9/2005 | Williams |
| D512,914 S | 12/2005 | Moretti |
| D516,577 S | 3/2006 | Matsuoka |
| D521,499 S | 5/2006 | Takita et al. |
| D525,612 S | 7/2006 | Densho |
| D527,898 S | 9/2006 | Tavone |
| D531,618 S | 11/2006 | Kennemer et al. |
| D536,614 S | 2/2007 | Peterson et al. |
| D547,062 S | 7/2007 | Chang |
| D560,116 S * | 1/2008 | Brassard ............... D14/251 |
| D572,465 S | 7/2008 | Beck |
| D601,366 S | 10/2009 | Barabas et al. |
| D605,188 S | 12/2009 | Martinez |
| D610,798 S | 3/2010 | Silvera |
| D618,692 S | 6/2010 | Deutsch et al. |
| D619,559 S | 7/2010 | Voorhees |
| D622,958 S | 9/2010 | Moore |
| D626,935 S | 11/2010 | Ohtani et al. |
| D627,330 S | 11/2010 | Otsuka |
| D633,477 S | 3/2011 | Lorenzo |
| D633,644 S | 3/2011 | Sprengers |
| D637,583 S | 5/2011 | Beal et al. |
| 7,987,148 B2 | 7/2011 | Hangartner et al. |
| D647,881 S | 11/2011 | Warner |
| D647,892 S | 11/2011 | Ragde, Jr. |
| D650,371 S | 12/2011 | Wibby et al. |
| D652,825 S | 1/2012 | Bau |
| D652,836 S | 1/2012 | Voorhees |
| D654,054 S | 2/2012 | Kohte et al. |
| 8,112,963 B2 * | 2/2012 | Johnson ............... B32B 3/08 |
| | | 52/698 |
| D655,692 S | 3/2012 | Silverman et al. |
| D656,135 S | 3/2012 | Swartz et al. |
| D656,926 S | 4/2012 | Jones, III et al. |
| D656,927 S | 4/2012 | Jones, III et al. |
| D656,928 S | 4/2012 | Jones, III et al. |
| D658,164 S | 4/2012 | Chan |
| D660,306 S | 5/2012 | Voorhees |
| 8,186,642 B2 * | 5/2012 | Weiss-Vons ......... B65H 75/143 |
| | | 248/205.5 |
| 8,317,046 B2 | 11/2012 | Vanderberg et al. |
| D675,197 S | 1/2013 | Losiewicz |
| D681,020 S | 4/2013 | Magness et al. |
| D681,612 S | 5/2013 | Palacios |
| D681,613 S | 5/2013 | Magness et al. |
| D689,479 S | 9/2013 | Soffer |
| D690,931 S | 10/2013 | Minn |
| D691,988 S | 10/2013 | Warner |
| 8,560,031 B2 * | 10/2013 | Barnett ............... F16M 13/00 |
| | | 455/575.8 |
| D693,818 S | 11/2013 | Webber |
| D694,222 S | 11/2013 | Thompson et al. |
| D694,463 S | 11/2013 | Sieczkowski |
| 8,616,327 B1 | 12/2013 | Palacios |
| 8,617,683 B2 * | 12/2013 | Johnson ............... B32B 3/08 |
| | | 428/53 |
| D699,757 S | 2/2014 | Wilkey |
| D703,647 S | 4/2014 | Kim |
| D703,949 S | 5/2014 | Chappell et al. |
| D705,199 S | 5/2014 | Huang et al. |
| D705,229 S | 5/2014 | Wengreen et al. |
| D705,764 S | 5/2014 | Thoni |
| D705,767 S | 5/2014 | Yoon |
| 8,737,066 B1 * | 5/2014 | Block ............... A45F 5/00 |
| | | 224/217 |
| D707,965 S | 7/2014 | Requa |
| D710,340 S | 8/2014 | Wengreen et al. |
| D714,126 S * | 9/2014 | Pyon ............... D8/349 |
| 8,844,098 B2 * | 9/2014 | Karmatz ............... B25G 1/102 |
| | | 16/422 |
| D715,784 S | 10/2014 | Lin et al. |
| D716,043 S | 10/2014 | Wilk |
| D717,780 S | 11/2014 | Tussy |
| D718,750 S | 12/2014 | Young et al. |
| D719,143 S | 12/2014 | Vidovic |
| D719,350 S | 12/2014 | Daoura |
| D721,373 S | 1/2015 | Logereau |
| D722,235 S | 2/2015 | Meng |
| D723,799 S | 3/2015 | Glass et al. |
| D724,841 S | 3/2015 | Schneider et al. |
| D726,234 S | 4/2015 | Needham |
| D728,230 S | 5/2015 | Oas |
| D728,535 S | 5/2015 | Degenkolb |
| D730,047 S | 5/2015 | Yi |
| D734,305 S | 7/2015 | Wengreen |
| D735,174 S | 7/2015 | Wengreen |
| D738,619 S | 9/2015 | Gluck |
| D738,872 S | 9/2015 | Erickson-Davis et al. |
| D739,389 S | 9/2015 | Prohaska |
| D743,409 S | 11/2015 | Chen |
| D745,014 S | 12/2015 | Vales |
| D745,274 S | 12/2015 | Minn et al. |
| D747,093 S | 1/2016 | Rogers |
| D748,615 S | 2/2016 | Lee et al. |
| D749,069 S | 2/2016 | Senoff |
| D749,549 S | 2/2016 | Wengreen |
| 9,250,652 B2 * | 2/2016 | London ............... G06F 1/163 |
| D751,289 S | 3/2016 | Gluck |
| 9,300,346 B2 * | 3/2016 | Hirsch ............... A45F 5/00 |
| D756,222 S | 5/2016 | Lopez et al. |
| D756,366 S | 5/2016 | Floersch |
| D759,966 S | 6/2016 | Pignotti |
| D761,236 S | 7/2016 | Wengreen |
| D763,835 S | 8/2016 | Wengreen |
| D765,063 S | 8/2016 | Wengreen |
| D765,064 S | 8/2016 | Wengreen |
| D766,228 S | 9/2016 | Haymond |
| D768,382 S | 10/2016 | Wu |
| D768,383 S | 10/2016 | Wu |
| D769,859 S | 10/2016 | Herbst et al. |
| D772,212 S | 11/2016 | Daniel et al. |
| D772,739 S | 11/2016 | Browning et al. |
| D772,882 S | 11/2016 | Paschke et al. |
| 9,486,910 B2 | 11/2016 | Stevens et al. |
| D773,325 S | 12/2016 | Browning et al. |
| D774,887 S | 12/2016 | Torrison et al. |
| D775,619 S * | 1/2017 | Tien ............... D14/250 |
| D775,824 S | 1/2017 | King |
| D776,426 S | 1/2017 | Smith |
| D776,529 S | 1/2017 | Torrison et al. |
| D777,025 S | 1/2017 | Turksu et al. |
| D777,162 S | 1/2017 | Erickson-Davis et al. |
| D778,884 S | 2/2017 | Taptic et al. |
| D779,466 S | 2/2017 | Wengreen |
| D780,166 S * | 2/2017 | Lin ............... D14/250 |
| D780,167 S * | 2/2017 | Tien ............... D14/250 |
| D780,449 S | 3/2017 | King |
| D781,832 S | 3/2017 | Saitko et al. |
| D783,593 S | 4/2017 | Chen |
| D784,811 S | 4/2017 | Scevola |
| D784,977 S | 4/2017 | Ormsbee et al. |
| D784,978 S | 4/2017 | Hobbs et al. |
| D789,076 S | 6/2017 | Pierre |
| D792,220 S | 7/2017 | Simons et al. |
| D794,007 S | 8/2017 | Zhang |
| D794,456 S | 8/2017 | Rockwell |
| D794,607 S | 8/2017 | Srour |
| D798,591 S | 10/2017 | King |
| D801,176 S | 10/2017 | Lynd et al. |

(56) References Cited

U.S. PATENT DOCUMENTS

| | | | |
|---|---|---|---|
| 9,787,348 B2 | 10/2017 | Srour | |
| 9,800,703 B2* | 10/2017 | Roux | H04B 1/3888 |
| D804,306 S | 12/2017 | Simons et al. | |
| D806,386 S | 1/2018 | King | |
| D807,746 S | 1/2018 | Fleming | |
| D808,158 S | 1/2018 | King | |
| D817,316 S | 5/2018 | Srour | |
| 9,970,589 B2 | 5/2018 | Hobbs et al. | |
| 10,082,163 B1* | 9/2018 | Srour | H04M 1/15 |
| 10,113,691 B2* | 10/2018 | Grieve | F16M 13/04 |
| 10,117,505 B1* | 11/2018 | Alvarez | A45F 5/00 |
| 10,469,640 B2* | 11/2019 | Gartz | H04M 1/04 |
| 10,561,228 B2* | 2/2020 | Britt | A45F 5/10 |
| 10,624,443 B2* | 4/2020 | Haber | A45F 5/10 |
| 10,638,627 B1* | 4/2020 | Stime | F16M 13/005 |
| 2004/0145870 A1 | 7/2004 | Minami et al. | |
| 2006/0007668 A1* | 1/2006 | Chien | A43D 999/00 362/103 |
| 2006/0283859 A1 | 12/2006 | Lu | |
| 2008/0060110 A1* | 3/2008 | Schmelzer | A44B 1/32 2/69 |
| 2008/0263839 A1* | 10/2008 | Stillwell | A43B 3/0078 24/713.6 |
| 2009/0091921 A1* | 4/2009 | Yang | A45C 13/08 362/103 |
| 2009/0300948 A1* | 12/2009 | Nordstrom-Wehner | A43B 23/24 36/136 |
| 2010/0155550 A1* | 6/2010 | Weiss-Vons | B65H 75/143 248/206.3 |
| 2011/0084081 A1* | 4/2011 | Chung | A45C 13/26 220/628 |
| 2011/0192857 A1 | 8/2011 | Rothbaum et al. | |
| 2012/0042476 A1* | 2/2012 | Karmatz | B25G 1/102 16/421 |
| 2012/0104185 A1* | 5/2012 | Carroll | F16M 13/00 248/27.1 |
| 2012/0168483 A1 | 7/2012 | Jambunathan et al. | |
| 2012/0228346 A1* | 9/2012 | Huang | A45F 5/00 224/218 |
| 2013/0001382 A1 | 1/2013 | Jang | |
| 2013/0067641 A1* | 3/2013 | Allen | A43B 23/24 2/245 |
| 2013/0148271 A1 | 6/2013 | Huang | |
| 2013/0277991 A1 | 10/2013 | Wu | |
| 2014/0317329 A1 | 10/2014 | Barnett et al. | |
| 2015/0077927 A1 | 3/2015 | Barnett et al. | |
| 2015/0084356 A1* | 3/2015 | Dinh | G06F 1/1656 294/25 |
| 2015/0201743 A1 | 7/2015 | Erickson-Davis et al. | |
| 2015/0288409 A1 | 10/2015 | Forsythe | |
| 2015/0335138 A1 | 11/2015 | Juarbe | |
| 2015/0365125 A1 | 12/2015 | Murphy et al. | |
| 2016/0039357 A1* | 2/2016 | Jang | B60R 11/0252 224/567 |
| 2016/0058162 A1 | 3/2016 | Wang et al. | |
| 2016/0069512 A1* | 3/2016 | Grieve | A45F 5/00 294/142 |
| 2017/0195000 A1* | 7/2017 | Srour | H04B 1/3888 |
| 2017/0293207 A1* | 10/2017 | Jeon | F16M 11/041 |
| 2018/0051846 A1* | 2/2018 | Hobbs | F16M 11/06 |
| 2018/0051851 A1* | 2/2018 | Hobbs | F16M 11/10 |
| 2018/0066791 A1 | 3/2018 | Hobbs et al. | |
| 2019/0089822 A1* | 3/2019 | Gartz | F16M 11/105 |
| 2019/0126154 A1* | 5/2019 | Sears | A63H 1/00 |
| 2019/0281961 A1* | 9/2019 | Peterson | A45F 5/10 |
| 2019/0304291 A1* | 10/2019 | Camp | G01S 19/16 |

* cited by examiner

SLIDING HINGE COLLAPSIBLE DISCS

FIELD OF THE DISCLOSED TECHNOLOGY

The disclosed technology relates to accessories which collapse, and more specifically, those that do so with sliding arms.

SUMMARY OF THE DISCLOSED TECHNOLOGY

A collapsible device of embodiments of the disclosed technology has a rotating hinge with a top section and bottom section, a top circular disc connected via a living hinge or sliding hinge to the top section of the rotating hinge, and a bottom circular disc connected via a second living hinge or second sliding hinge to the bottom section.

A "disc" is defined as "a device with a substantially circular most elongated plane thereof." The directions "top" and "bottom" are relative and interchangeable for purposes of this disclosure. In some embodiments, there is a horizontal line or plane of symmetry between the top and bottom halves of the device.

A "living hinge" is defined as "a flexure bearing which is flexible (changeable angle) and connects two rigid elements together in a way in which the rigid pieces can repeatedly (1000+ times) bend relative to one another and remain connected." Living hinges of embodiments of the disclosed technology are formed from thinned plastic material between disc and a part of a rotating hinge. In some embodiments, a disc, living hinge, and rotating hinge are formed together in a single mold. In some embodiments, two of such single molds are formed and a pin joins the rotating hinges together to form the collapsible device.

A "rotating hinge" is nomenclature used to differentiate from the "living hinge". A "rotating hinge" is a device or elements of a device which rotate relative to one another and around a pin which connects between the elements which rotate relative to one another. The portion of the elements which rotate around a pin is called the "frictional" section because in embodiments of the disclosed technology the top and bottom portion of the hinge which rotate around the pin. Friction hinders movement the top and bottom section relative to one another so that the device can rest in a stable configuration, whether expanded or contracted. An external expansion or contraction force is required, in embodiments of the disclosed technology, to expand or contract the hinges which moves the discs further or closer to each other.

A "sliding hinge" or to be "slidably hinged" is to rotates a flange by having the flange move parallel along a length of an inset, cutaway, cavity, or portal in a disc changing an angle of the flange relative to the disc or discs.

A pair of collapsible discs include, in an embodiment of the disclosed technology, a top disc with a hinged connection to a flange or multiple flanges. A bottom disc with a cavity holds a crossbeam of the flange or flanges such that the crossbeam is slidably hinged within the cavity of the bottom disc. "Collapsible" is defined as "able to expand and contract repeatedly while maintaining all parts thereof and structural integrity."

The hinged connection to the top and/or bottom disc can be a living hinge and/or a sliding hinge. A slidable hinge can be a hinge which uses a crossbeam connected to or forming in unitary structure with a flange, the crossbeam sliding along a length or most elongated length of a cavity within the top and/or bottom disc. It should be understood that "top" and "bottom" or relative to the position of the discs with one being defined as being at a "top" side and the other being defined as being an opposite and "bottom side". Thus, horizontal movement is transverse to a line or plane passing between the top and bottom.

In some embodiments, there are four flanges each arranged at one a cardinal direction, that is, at a 90 or 180 degree angle to each other. Each of the four flanges includes a crossbeam which extends into a respective cavity of the bottom disc, and in some embodiments, in additional such crossbeam on the opposite side into the top disc. The crossbeam, in embodiments of the disclosed technology, is wider than an opening into the cavity which is transverse to a direction of movement of the crossbeam when the top disc and the bottom disc move closer or further from one another.

The pair of collapsible discs have at least three different distances or configurations with respect to one another which are entered or passed through between fully pulling apart ("an expanded condition") and fully collapsing the discs (moving them as close as possible to one another). In the expanded condition, the flange substantially abuts or does abut an edge of an opening to the cavity, the edge being the edge which is closest to a center point of a most elongated plane of the top disc and/or the bottom disc. In other words, the flange hits the inside or interior side of the cavity. This is the side nearest to the center of the circular plane of the respective discs. For purposes of this disclosure, "substantially abuts" is defined as "close enough that it can be confused for touching when viewed from at least some vantage points."

A partially collapsed condition is between the expanded and fully collapsed condition where the crossbeam of the flange (or flanges) is midway (which includes substantially midway) between the edge of the opening to the cavity closest to the center point and an opposite edge of the opening to the cavity, the opposite edge being the side of the opening into the cavity which is furthest from the center point of the circular disc (most exterior). In the fully collapsed condition the crossbeam abuts (including substantially abutting) a part of the cavity furthest from the center point. In such a collapsed condition the top disc and the bottom disc are abutted or substantially abutted against one another. In a resting condition (such as with only the force of gravity acting upon the device while the bottom of the devices is closed to the center of the Earth or while the device is in any other orientation), friction between the crossbeam and the cavity causes collapsible discs in an expanded condition to remain in the expanded condition in some embodiments of the disclosed technology.

The at least one flange is at least two flanges having a length thereof which each extends between the top disc and the bottom disc, each length of each respective flange being parallel to each another in embodiments of the disclosed technology. While the angle of the flanges changes as the top and bottom disc move with respect to each other, the parallel nature of the flanges remains in the same in this embodiment. This can further be used with a portal through one of the flanges where the other flange passes through such that one flange is actually "U" or "O" shaped and the other is a sans-serif "I" shape or serif "I" shape when including the crossbeams. A pin can connect two or more flanges together which adds to or creates enough friction to prevent the two discs from moving toward each other when the discs are at rest with respect to the Earth and/or one another.

The crossbeam of each of the at least two flanges move in opposite directions when the top disc and the bottom disc are moved towards one another in embodiments of the disclosed technology. The cavity of one of the discs can be a plurality of separate cavities or a single cavity with a plurality of rectangular openings.

Described another way, two discs at each of a top and bottom side of a device which, when separated, remain at rest with respect to one another due to friction at (meaning, "within" and/or "with") flanges situated between and connecting the two discs. Pressure pushing the two discs together causes the flanges to be oriented in a more horizontal direction with respect to the top and the bottom direction by way of at least one crossbeam fixedly connected to, or part of, at least one of the flanges, the crossbeam being moved horizontally through a cavity or cavities of one of the discs as the two discs are pushed together.

There can be two flanges which move in opposite directions when the two discs are pushed together. A first of the two flanges passes through a portal in another of the second of the two flanges in embodiments of the disclosed technology. The at least two flanges are two sets of flanges in some embodiments. Each respective flange moves away from each other respective flange in it's set. That is, each set has two flanges disposed inline with each other but moving in opposite directions as the discs are collapsed (pushed) together. The sets are at right angles or move transverse to one another in such embodiments of the disclosed technology.

The flanges are each connected to one or both of the top or the bottom disc by way of a living hinge in embodiments of the disclosed technology. The afore-described cavity is a single cavity through which each flange of the two flanges moves through in some embodiments of the technology, while in other embodiments, the cavity is a plurality of separate cavities and each flange of the two flanges has a respective crossbeam in a separate cavity of the cavities.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Collapsible discs move towards or away from each other in embodiments of the disclosed technology by changing the angle of flanges which connect the two discs together. The flanges connect to each respective disc by way of one of a living hinge and/or a slidable hinge where a slidable hinge is one which includes a crossbeam wider than a body of the flange which slides within a cavity of one of the discs. This can be accomplished with two flanges which move in opposite directions, or two sets of two flanges, each set offset 90 degrees from one another. The two flanges can also be arranged such that one passes through a portal in the other or arranged side by side.

Embodiments of the disclosed technology will become more clear in view of the following description of the figures.

Figure 1:
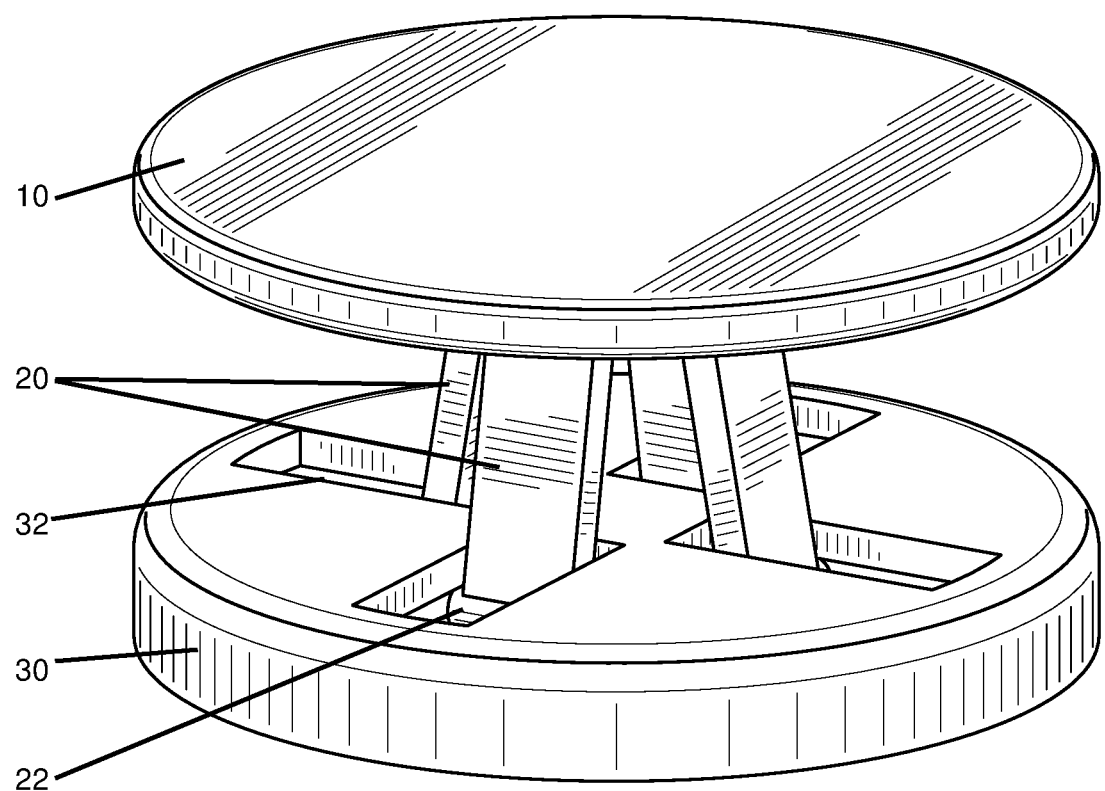
FIG. 1 shows a top and side perspective view of collapsible discs with sliding flanges in embodiments of the disclosed technology.
Figure 2:
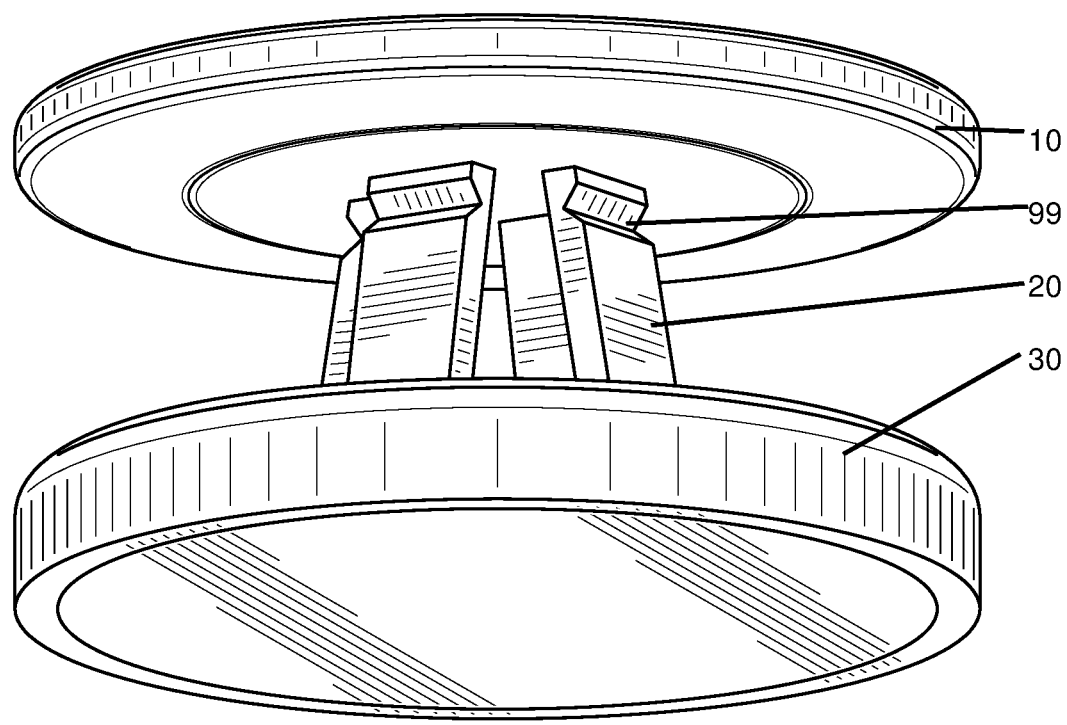
FIG. 2 shows a bottom and side perspective view of the collapsible discs of FIG. 1.

FIG. 1 shows a top and side perspective view of collapsible discs with sliding flanges in embodiments of the disclosed technology. FIG. 2 shows a bottom and side perspective view of the collapsible discs of FIG. 1. Here, two discs, a top disc 10 and a bottom disc 30 are in parallel to one another. The top disc is connected to each flange 20 by way of a living hinge 99 (see definition in the "summary") or flexural hinge. Each flange has a top end which is adjacent to the top disc 10 and a bottom end which is adjacent to the bottom disc 30. In the embodiment shown, the bottom end of each flange 20 is a crossbeam 22 which is created as an integrated structure or fixedly attached to the body of (the section with the most elongated flat region or equivalent thereof if another shape is used) of the respective flange 20. The crossbeam 22, in embodiments of the disclosed technology, is wider than the body of the flange 20. The crossbeam 22 is horizontally movable through a cavity 32 of a disc, such as a bottom disc 30. A portal opening into the cavity is wider than the body of the flange 20, but the cavity itself is wider than the opening and wider than the crossbeam 22. As such, the crossbeam is held within the cavity and can move along a length thereof, as it does, changing an angle of the body of the respective flange 20. In conjunction, four such flanges, as such in FIGS. 1 and 2, move at the same time and move away or towards a center point or center line which passes between a center of the top and bottom discs 10 and 20.

Figure 3:
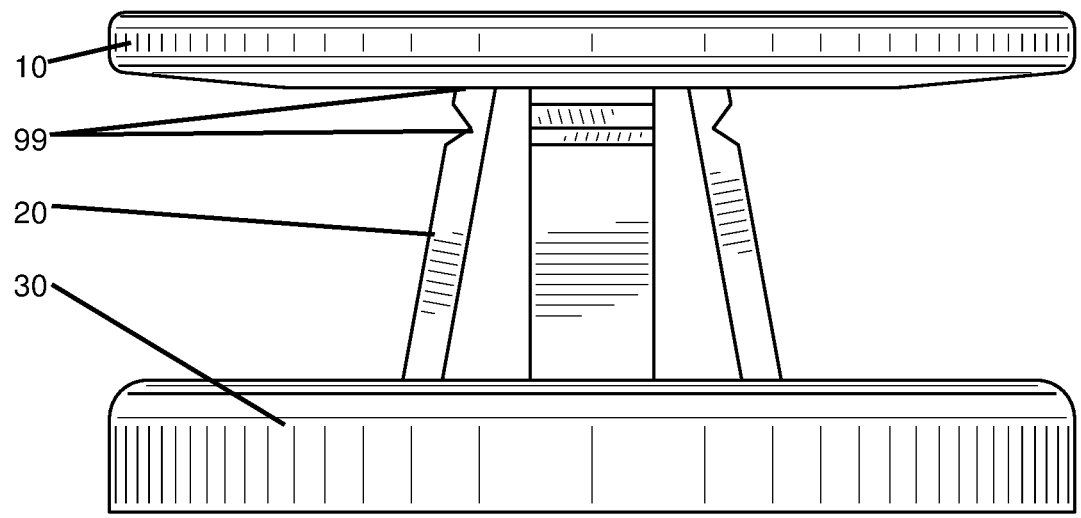
FIG. 3 shows a first elevation view of the collapsible discs of FIG. 1.
Figure 4:
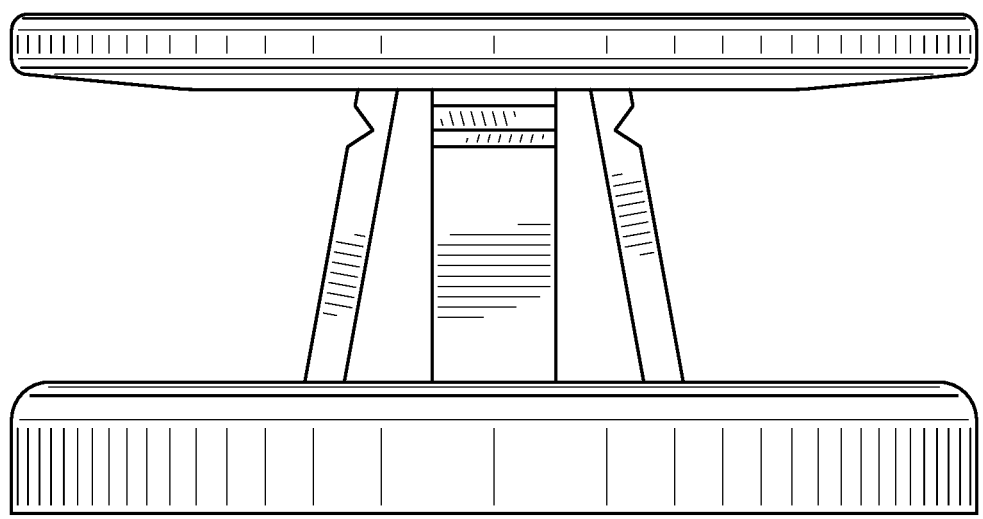
FIG. 4 shows a second elevation view of the collapsible discs of FIG. 1.

FIG. 3 shows a first elevation view of the collapsible discs of FIG. 1. FIG. 4 shows a second elevation view of the collapsible discs of FIG. 1. In these figures, one can see the depth of the living hinges 99 which allow for the bending of the flanges 20 to accommodate the movement of the discs closer to one another. The left and right flanges 20 (referring to the side of the paper relative to one another in these views) are at a first acute angle in this expanded condition, and as the discs collapse (move towards each other) the angle increases and becomes more acute and more obtuse (depending on the side of the flange) while the bottom part of the flanges moves towards a side of the device (and paper) and the top remains in place.

Figure 5:
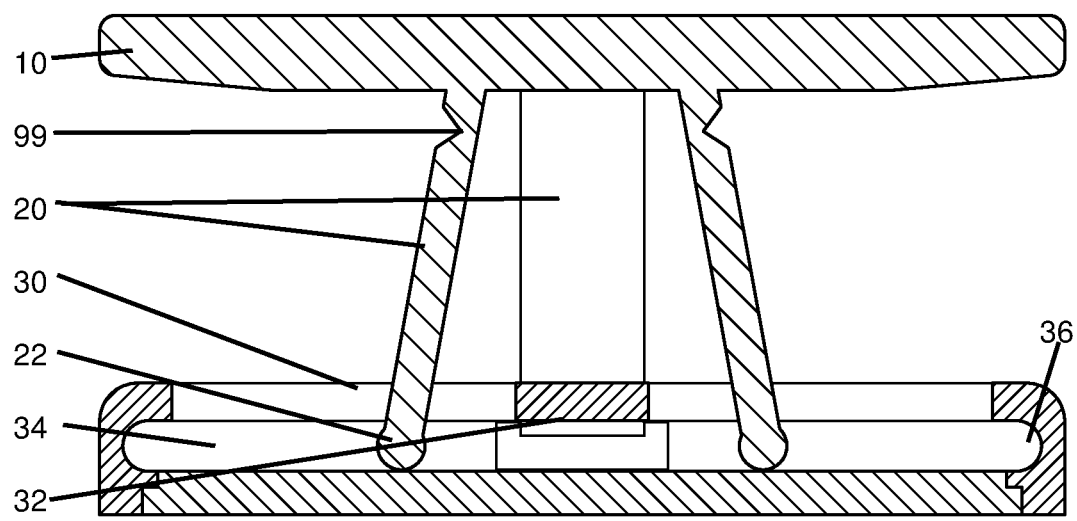
FIG. 5 shows a cross section elevation view of the collapsible discs of FIG. 1 in an expanded condition in an embodiment of the disclosed technology.
Figure 6:
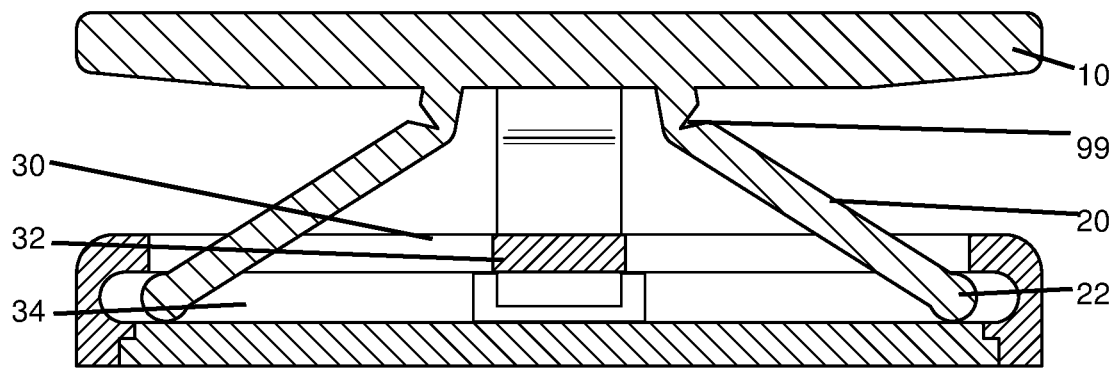
FIG. 6 shows a cross section elevation view of the collapsible discs of FIG. 1 in a collapsing condition in an embodiment of the disclosed technology.
Figure 7:
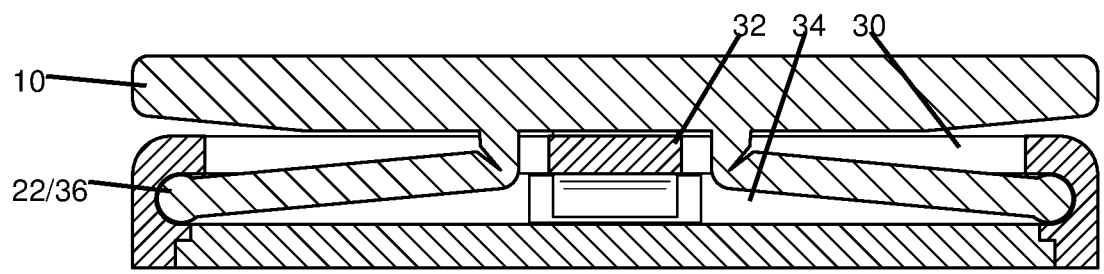
FIG. 7 shows a cross section elevation view of the collapsible discs of FIG. 1 in a collapsed condition in an embodiment of the disclosed technology.

FIG. 5 shows a cross section elevation view of the collapsible discs of FIG. 1 in an expanded condition in an embodiment of the disclosed technology. FIG. 6 shows a cross section elevation view of the collapsible discs of FIG. 1 in a collapsing condition in an embodiment of the disclosed technology. FIG. 7 shows a cross section elevation view of the collapsible discs of FIG. 1 in a collapsed condition in an embodiment of the disclosed technology. Referring first to FIG. 5, one can see that the flanges 20 are in their most upright condition here and become more horizontal as the discs 10 and 30 are collapsed together. A top side of the bottom disc 30 is open at least partially at what is a portal or multiple separate portals. The flanges 20 terminate at their respective crossbeams 22 which slide horizontal within the portal while the flanges 20 rotate as they change angle. In a fully collapsed condition in embodiments of the disclosed technology, such as shown in FIG. 7, the crossbeams 22 are at extreme edges/abutment points 36 of the cavity 34 of the disc. The extreme edges 36 are the ends of the cavity in each horizontal direction. Note that in the collapsed condition the living hinge 99 is most bent or maximally bent or substantially maximally bent.

Figure 8:
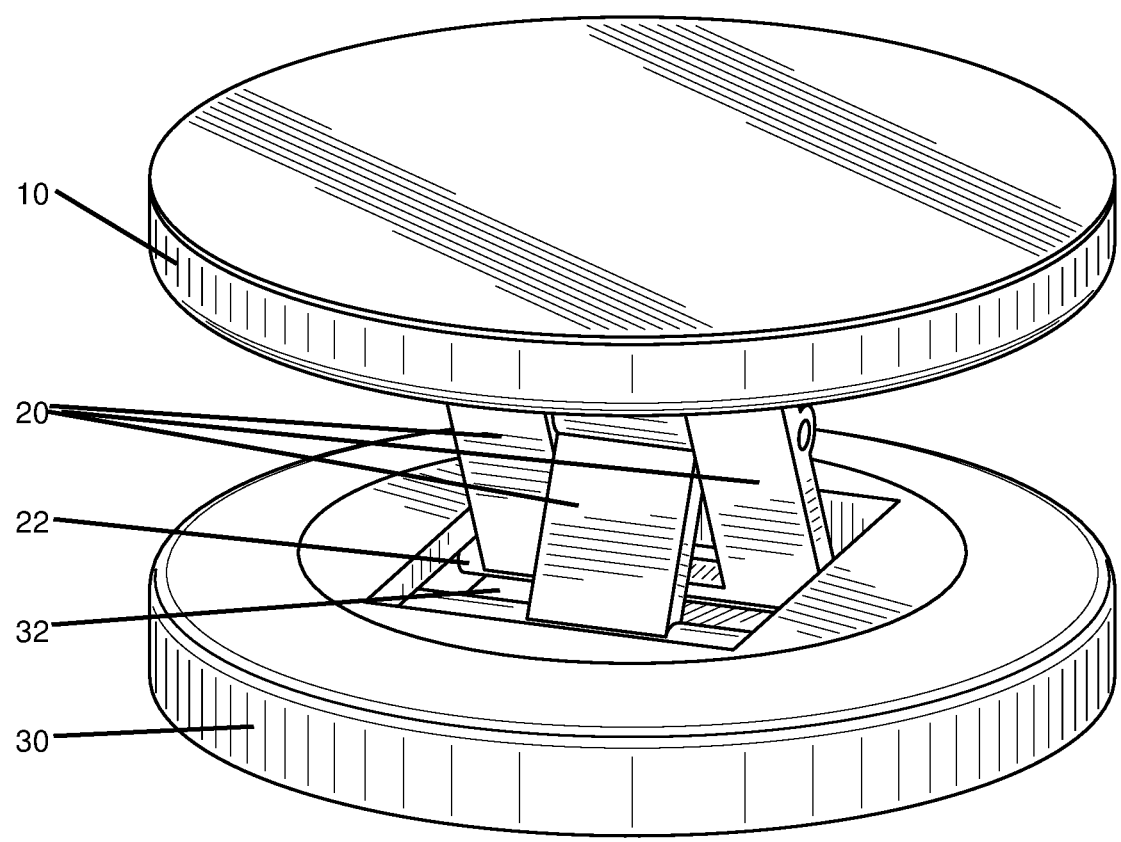
FIG. 8 shows a top and side perspective view of collapsible discs with parallel sliding flanges in embodiments of the disclosed technology.
Figure 9:
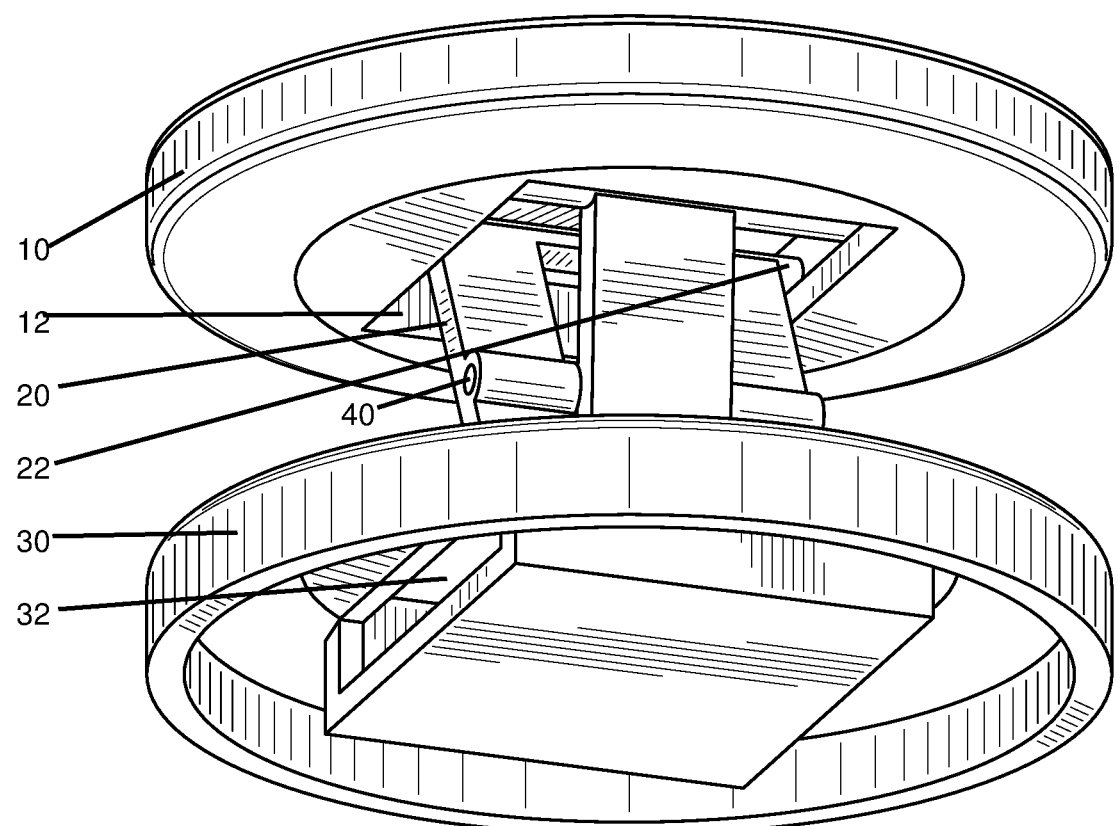
FIG. 9 shows a bottom and side perspective view of the collapsible discs of FIG. 8.
Figure 10:
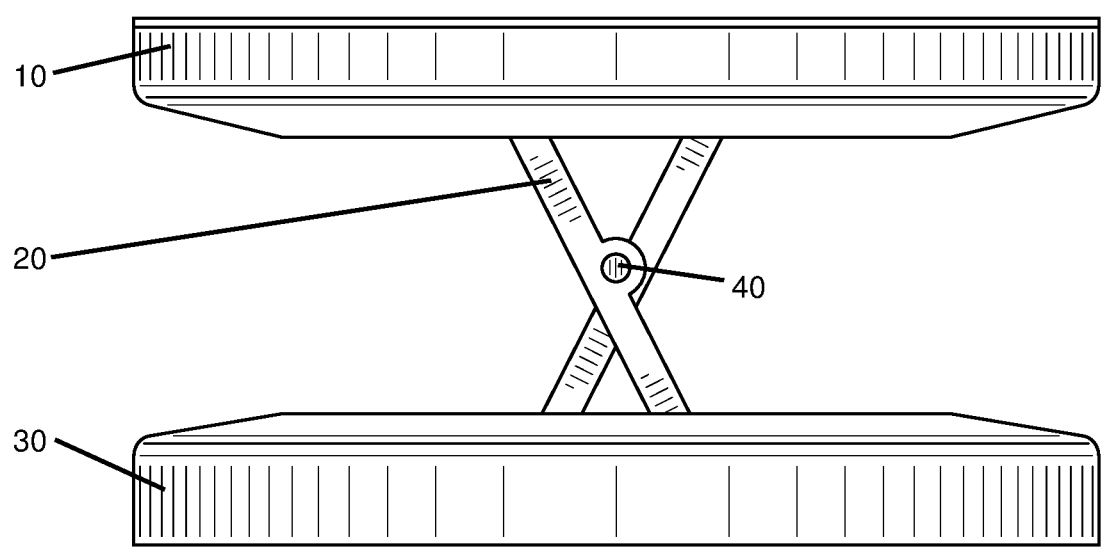
FIG. 10 shows a first side elevation view of the collapsible discs of FIG. 8.

FIG. 8 shows a top and side perspective view of collapsible discs with parallel sliding flanges in embodiments of the disclosed technology. FIG. 9 shows a bottom and side perspective view of the collapsible discs of FIG. 8. FIG. 10 shows a first side elevation view of the collapsible discs of FIG. 8. All the elements described with reference to FIG. 1-7 are numbered in the same manner though the flanges 20 differ in shape, with a first flange 20 having a portal through which another second flange 20 passes through. Thus, instead of two flanges 20 falling next to each other (FIGS. 1-7), they fall through each other (FIGS. 8-16). This creates a scissor-like structure as best seen in FIG. 10, crossing at a pivot point and frictional pin 40. The pin 40 adds to, or creates enough friction such that the discs 10 and 30 remain stationary with respect to one another when the device as a whole is left at rest.

Figure 11:
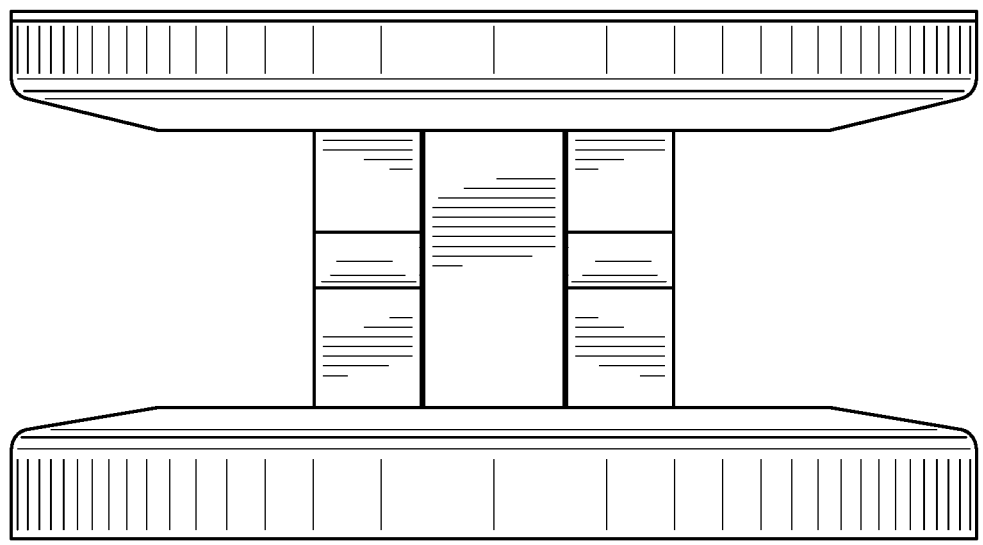
FIG. 11 shows a second side elevation view of the collapsible discs of FIG. 8.
Figure 12:
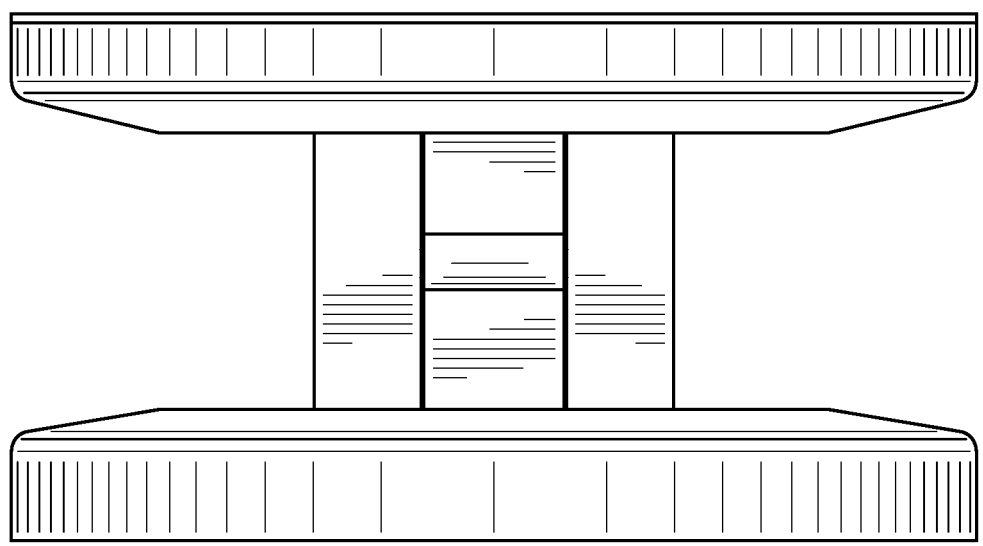
FIG. 12 shows a third side elevation view of the collapsible discs of FIG. 8.

FIG. 11 shows a second side elevation view of the collapsible discs of FIG. 8. FIG. 12 shows a third side elevation view of the collapsible discs of FIG. 8. In these further views, in a fully expanded configuration (the discs 10 and 30 as far apart as possible) the flanges form a substantially planar or substantially flat surface such that the device is I-bean shaped from this side view. One then has maximum room to wrap a wire there-around, such as a wire to earphones.

Figure 13:
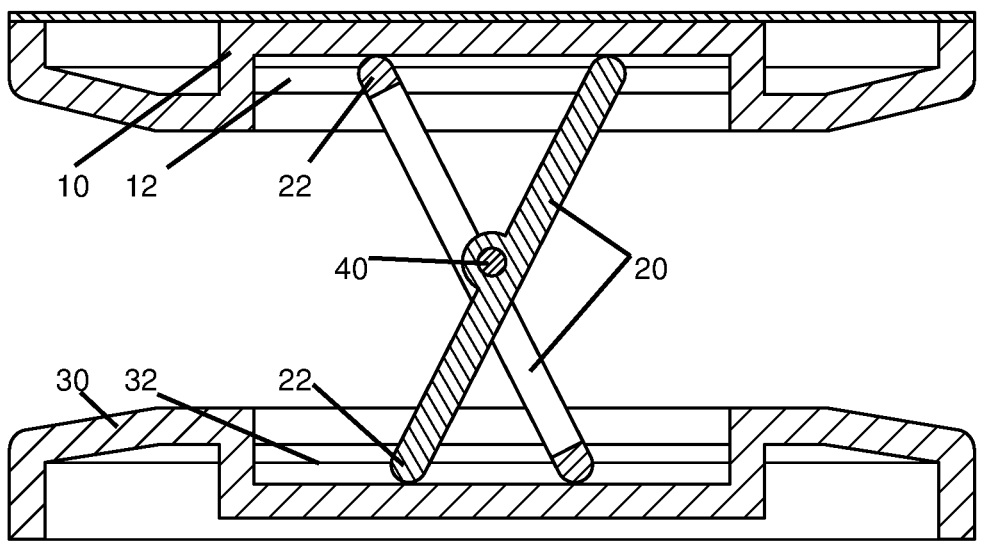
FIG. 13 shows a cross section elevation view of the collapsible discs of FIG. 8 in an expanded condition.
Figure 14:
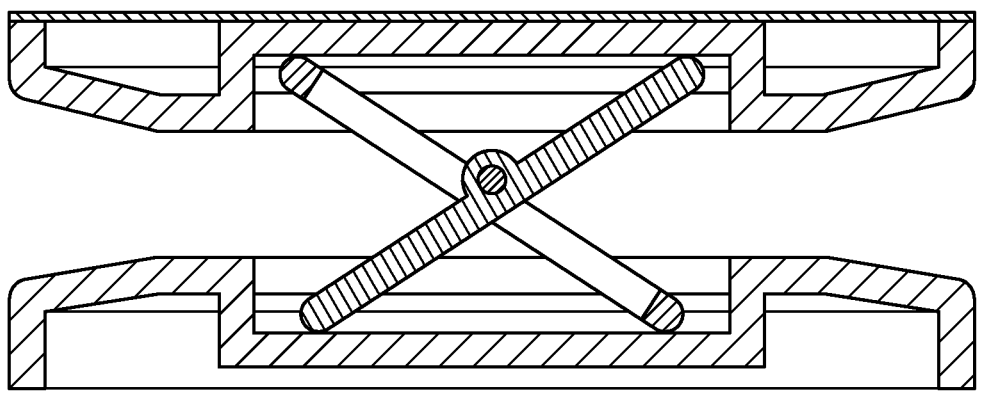
FIG. 14 shows a cross section elevation view of the collapsible discs of FIG. 8 in a collapsing condition.
Figure 15:
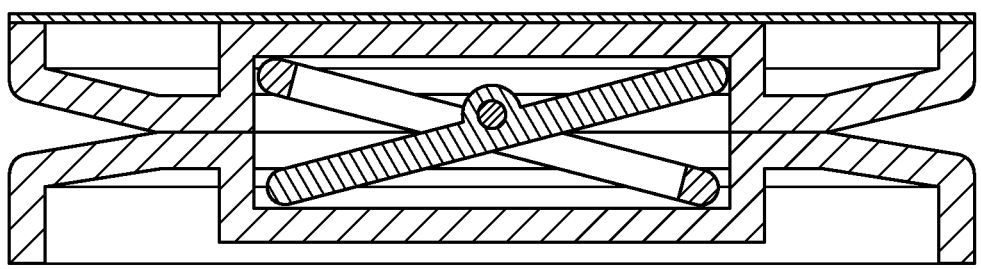
FIG. 15 shows a cross section elevation view of the collapsible discs of FIG. 8 in a collapsed condition.

FIG. 13 shows a cross section elevation view of the collapsible discs of FIG. 8 in an expanded condition. FIG. 14 shows a cross section elevation view of the collapsible discs of FIG. 8 in a collapsing condition. FIG. 15 shows a cross section elevation view of the collapsible discs of FIG. 8 in a collapsed condition. Here, one can see that in an expanded condition the flanges 20 are nearest to a center of a horizontal length of the cavities 12 and 32 of the respective discs 10 and 30. As the discs 10 and 30 move closer together, the flanges move towards the edges until abutting or substantially abutting the edges of the horizontal extent of the cavities.

Figure 16:
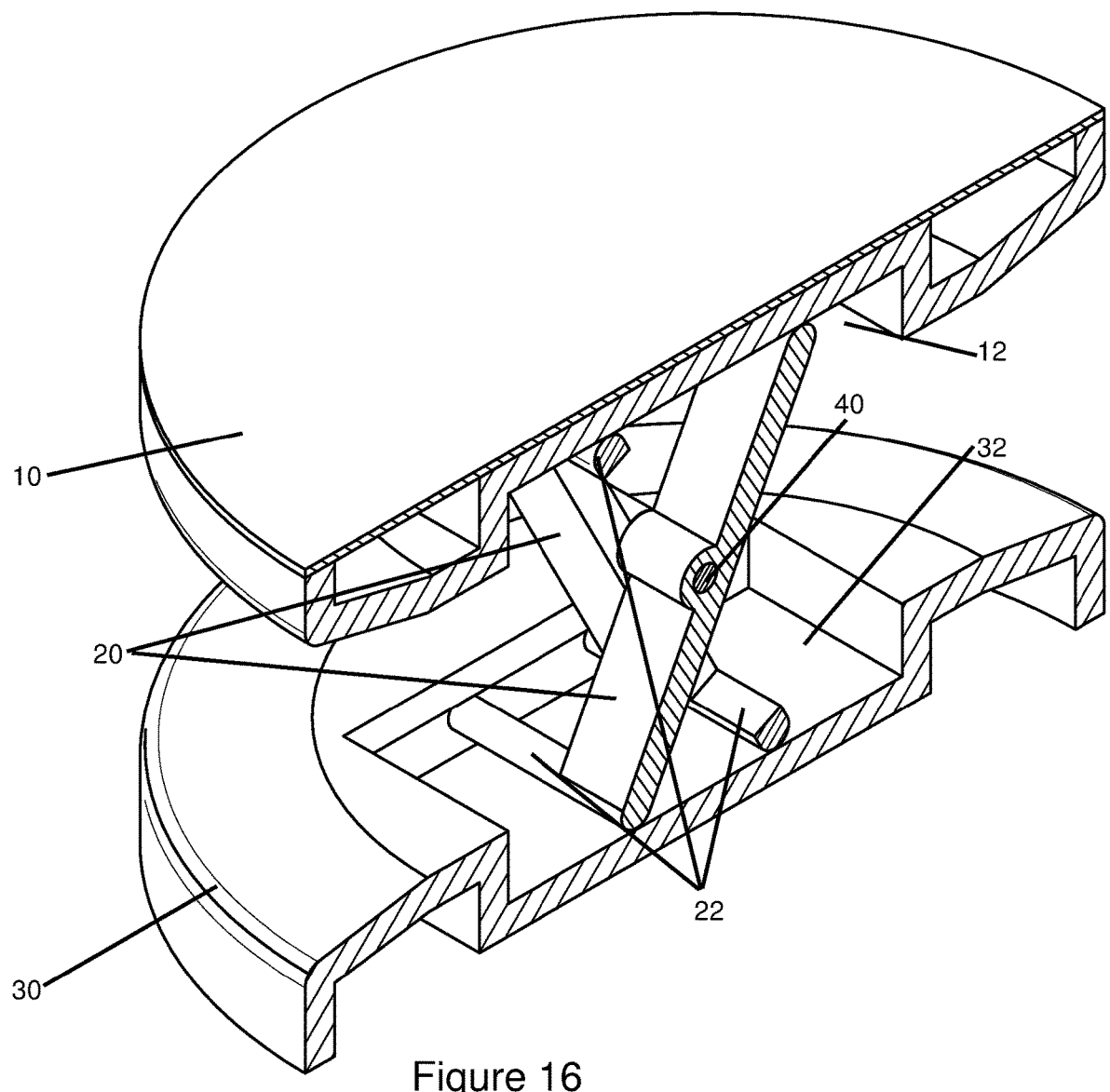
FIG. 16 shows a cutaway top and side perspective view of the collapsible discs of FIG. 8.

FIG. 16 shows a cutaway top and side perspective view of the collapsible discs of FIG. 8. The flanges 20 with slidably hinged crossbeams 22 are wider than and within a portal opening into the respective cavities 12 and 22.

The covers can be identical or substantially identical where "substantially identical" is defined as having a same or substantially the same circular circumference of a most elongated or largest plane but having different depths and/or lips. For example, the top disc 10 can have a downward extending lip. That is, having different depths is still to be considered within the definition of "substantially" provided in the Summary of this disclosure.

Referring to all of the embodiments simultaneously, the devices can be procured out of two molds and a pin or other frictional device which connects between flanges, rotatable hinges or rotatable hinge parts. The two molds can be identical or substantially identical (e.g. but for a lip or depth of a disc). Thus, a mold can be used to create a disc and flange together or separately with other such corresponding molds making up a bottom side thereof.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A pair of collapsible discs, comprising:
   a top disc with a respective hinged connection to each flange of multiple flanges, each of said multiple flanges being arranged equidistantly from an adjacent flange of said multiple flanges;
   a bottom disc with a plurality of cavities, such that each cavity of said plurality of cavities holds a crossbeam of one of said multiple flanges such that each said crossbeam is slidably hinged within a respective said cavity of said plurality of cavities of said bottom disc;
   wherein each said hinged connection to said top disc is a living hinge; and
   wherein said hinged connection of said top disc comprises a slidably hinged flange of said multiple flanges within a cavity of said plurality of cavities of said bottom disc.

2. The pair of collapsible discs of claim 1, wherein said multiple flanges are four flanges each arranged at a 90 or 180 degree angle to each other of said four flanges.

3. The pair of collapsible discs of claim 2, wherein each of said four flanges includes a crossbeam which extends into a respective cavity of said bottom disc.

4. The pair of collapsible discs of claim 1, wherein said crossbeam is wider than an opening into a cavity of said plurality of cavities which is transverse to a direction of movement of said crossbeam when said top disc and said bottom disc move closer or further from one another.

5. The pair of collapsible discs of claim 1, wherein said collapsible discs have at least three configurations, wherein moving said top disc and said bottom disc towards each other cause said at least three configurations to be, in order:
   1) an expanded condition where each flange of said plurality of flanges substantially abuts or abuts an edge of an opening to a respective cavity of said plurality of cavities closest to a center point of a most elongated plane of said top disc and/or said bottom disc;

2) a partially collapsed condition where each said crossbeam of one of said plurality of flanges is midway between said edge of said opening to said respective cavity of said plurality of cavities closest to said center point and an opposite edge of said opening to said respective cavity of said plurality of cavities furthest from said center point; and 3) a fully collapsed condition where each said crossbeam abuts a part of said respective cavity of said plurality of cavities furthest from said center point and said top disc and said bottom disc are abutted or substantially abutted against one another.

6. The pair of collapsible discs of claim 5, wherein in a resting condition, friction between said crossbeam and a cavity of said plurality of cavities causes said collapsible discs in said expanded condition to remain in said expanded condition.

7. The pair of collapsible discs of claim 1, wherein said multiple flanges which are connected to said top disc by way of said living hinge are at least two flanges having a length thereof which extends between said top disc and said bottom disc which remain parallel to one another when said top disc and said bottom disc are moved towards or away from each other.

8. The pair of collapsible discs of claim 7, wherein a first flange of said at least two flanges has a portal through which a second flange of said at least two flanges passes through.

9. The pair of collapsible discs of claim 7, where a pin connects said at least two multiple flanges together creating enough friction or additional friction to prevent said two discs from moving toward each other when said discs are at rest.

10. The pair of collapsible discs of claim 9, wherein said crossbeam of each of said at least two flanges move in opposite directions when said top disc and said bottom disc are moved towards one another.

11. The pair of collapsible discs of claim 1, wherein each cavity of said plurality of cavities has a plurality of rectangular openings, each of said openings being defined by four full or partial edges.

12. A collapsible disc device comprising:

two discs at each of a top and bottom side of said device which, when separated, remain at rest with respect to one another due to friction at flanges situated between and connecting said two discs;

wherein pressure pushing said two discs together causes said flanges to be oriented in a more horizontal direction with respect to said top and said bottom direction by way of at least one crossbeam fixedly connected to, or part of, at least one of said flanges, said crossbeam being moved horizontally through a cavity or cavities of one of said discs as said two discs are pushed together;

wherein said flanges are each connected to one of said top or said bottom disc by way of a living hinge;

wherein each flange of said flanges is arranged equidistantly from an adjacent flange; and wherein each cavity of said cavities is arranged equidistantly from an adjacent cavity.

13. The collapsible disc of claim 12, wherein said flanges are at least two flanges which are configured to move in opposite directions when said two discs are pushed together.

14. The collapsible disc of claim 13, wherein a first of said two flanges passes through a portal in another of said second of said two flanges.

15. The collapsible disc of claim 13, wherein said at least two flanges are two sets of flanges, wherein each respective said flange moves away from each other respective said flange in a respective set of said two sets of flanges.

16. The collapsible disc of claim 13, wherein said cavity or said cavities is a single cavity through which each flange of said two flanges moves through.

\* \* \* \* \*